May 4, 1926.　　　　　W. C. PAULING　　　　1,583,256
POWER TRANSMISSION
Filed June 4, 1925
Fig. 1
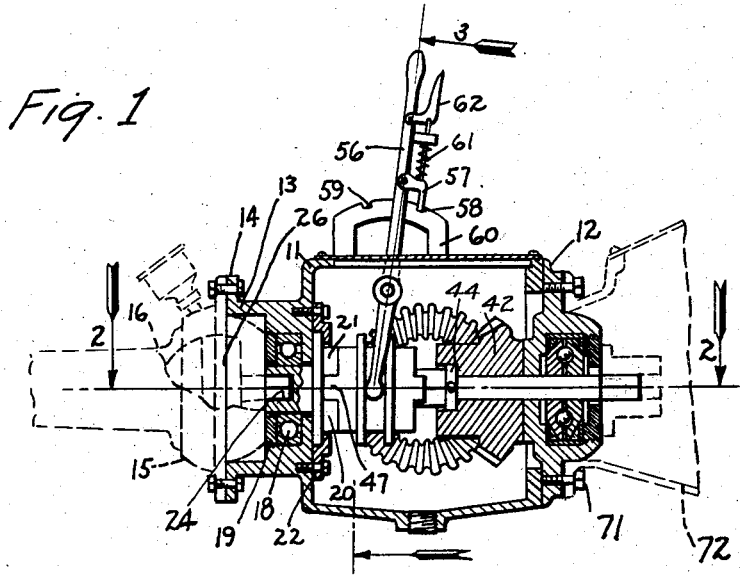
Fig. 2
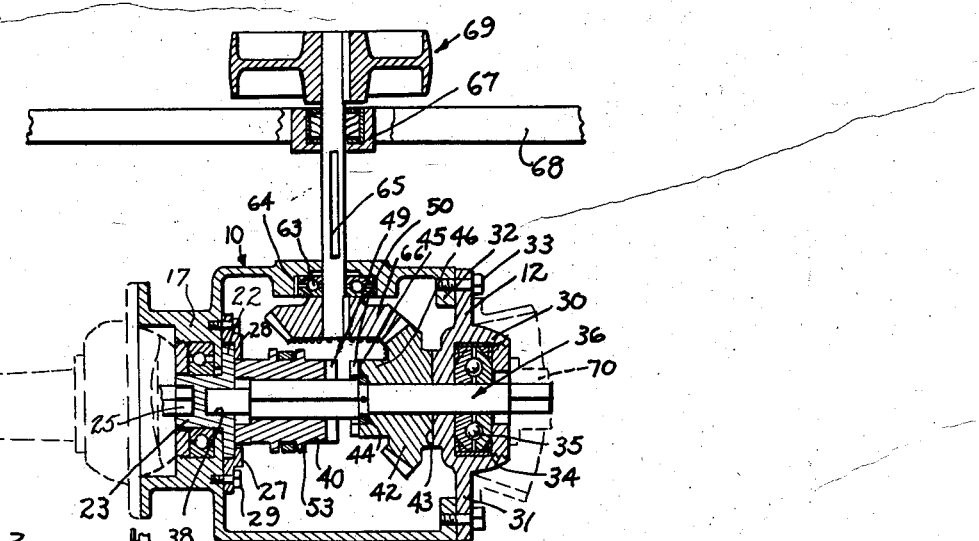
Fig. 3
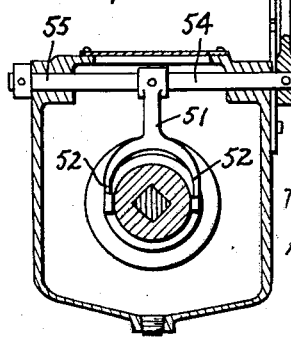
Fig. 4　Fig. 5
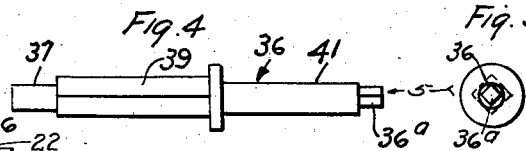
Fig. 6　Fig. 7　Fig. 8
Inventor
William C. Pauling.
by: Hazard and Miller
Attys.

Patented May 4, 1926.

1,583,256

UNITED STATES PATENT OFFICE.

WILLIAM C. PAULING, OF LONG BEACH, CALIFORNIA.

POWER TRANSMISSION.

Application filed June 4, 1925. Serial No. 34,822.

*To all whom it may concern:*

Be it known that I, WILLIAM C. PAULING, a citizen of the United States, residing at Long Beach, in the county of Los Angeles and State of California, have invented new and useful Improvements in Power Transmissions, of which the following is a specification.

This invention relates to power transmission.

The object of this invention is to provide a transmission adapted to be installed on a motor vehicle between the clutch and the universal joint of a drive shaft, and adapted to either transmit power from the engine to the drive shaft or with a counter-shaft which may be utilized for driving stationary machinery.

Another object of the invention is to provide a transmission adapted to be installed on a motor vehicle between the clutch and the universal joint of a drive shaft, and adapted to either transmit power from the engine to the drive shaft or with a counter-shaft which may be utilized for driving machinery carried by the motor vehicle.

Another object of the invention is to provide a power transmission having a main shaft and a counter-shaft having constantly meshing gears thereon, which is adapted to be installed on a motor vehicle between the engine clutch and the drive shaft of the vehicle and being provided with a clutch on the main shaft which is adapted to form a connection between the engine clutch and the drive shaft or the engine clutch and the counter-shaft.

The objects are attained by the disclosure herein set forth by the following description of the accompanying drawings, in which, Figure 1 is a transverse section through the power transmission;

Fig. 2 is a horizontal section taken on line 2—2 of Fig. 1.

Fig. 3 is a vertical section taken on line 3—3 of Fig. 1.

Fig. 4 is a side elevation of the main shaft of the power transmission.

Fig. 5 is an end elevation of the main shaft of the transmission looking in the direction indicated by the arrow 5.

Fig. 6 is a side elevation of the clutch coupling of the transmission.

Fig. 7 is a transverse section of the clutch coupling taken on line 7—7 of Fig. 6.

Fig. 8 is an end elevation of the clutch coupling.

Referring by numerals to the accompanying drawings, 10 designates a housing formed in two parts 11 and 12 respectively, the part 11 has an extended portion 13, provided with a flange 14 which is adapted to be connected to the universal joint housing of the drive shaft 16. A hub 17 is formed on the interior of the portion 11 and forms a support or housing for an anti-friction bearing 18, which is held in place by a retaining ring 19.

A clutch coupling generally designated at 20, has a head 21, having a lateral flange 22, from which extends a hub 23, which is adapted to extend through the anti-friction bearing 18. The hub 23 has a square recess 24 which is adapted to receive the male knuckle 25 of the universal joint 26. The clutch coupling 20 is retained in place by means of a ring member 27 which has an internal flange 28 engaging the flange 22 and held in place by means of cap screws 29.

The part 12 of the housing 10 has a hub 30 from which extends a flange 31 adapted to engage a flange 32 formed on the part 11 and is held in place thereon by cap screws 33. The hub 30 has an internal annular recess 34 in which is mounted an anti-friction bearing 35 which is adapted to support a main shaft generally designated at 36. The shaft 36 has a round end portion 37 adapted to extend into an annular internal recess 38 formed in the clutch coupling 20 and is provided with a square portion 39 upon which is mounted a jaw clutch 40. The shaft 36 has a round portion 41 upon which is mounted a beveled gear 42 having a flat face 43 engaging the hub 30 and is retained in place on the shaft by a set collar 44 which is mounted in a recess 45 formed in the hub 46.

The clutch 40 is slidable on the square portions 39 of the shaft 36 and has a pair of oppositely disposed jaws 47 adapted to interlock in recesses 48 formed in the clutch coupling 40. A pair of oppositely disposed jaws 49 are formed on the opposite end of the clutch 40 and are adapted to interlock in recesses 50 formed on the hub 46 of the gear 42. The clutch is shifted by means of a yoke 51 having arms 52 engaging a pair of lateral flanges 53 formed on the clutch 40.

The yoke 51 is mounted on a shaft 54 extending through openings 55 formed in the upper portion of the part 11 of the housing 10. A shifting lever 56 is mounted on the outer end of the shaft 54 and is provided with a pawl 57 adapted to engage notches 58 and 59 formed in a plate 60 secured to the housing 10. The pawl 57 is held in place by a coil spring 61 and may be lifted by a handle 62 of the usual construction.

An anti-friction bearing 63 is mounted in a recess 64 formed in the portion 11 of the housing 10 and is adapted to receive one end of a counter-shaft 65 upon which is mounted a beveled gear 66 constantly meshing with the gear 42 on the shaft 36. The outer end of the shaft 65 is mounted in an anti-friction bearing 67 carried by the side bar 68 of the frame of the motor vehicle.

A pulley or gear indicated at 69 is secured to the end of the shaft 65 and may be utilized for transmitting power to stationary machinery independent of the motor vehicle or for operating machinery carried by the vehicle.

The outer end of the shaft 36 is provided with a square head 36ª which is adapted to engage a drive plate 70 of the clutch of the main transmission (not shown). The housing 10 is held in place by cap screws 71 extending through openings formed in the main transmission case 72 of the engine of the motor vehicle.

From the construction it will be seen that when the clutch 40 is in engagement with the clutch coupling 20, power from the engine of the motor vehicle may be transmitted directly to the drive shaft 16 and when the clutch 40 is in engagement with the gear 42, power from the engine may be transmitted to the counter-shaft 65, without rotating the drive shaft 16. Hence it is not necessary to jack either of the rear wheels of the vehicle when operating the counter-shaft.

Various changes may be made without departing from the spirit of the invention as claimed.

What is claimed is:

A power transmission comprising in combination a housing in the form of a rectangular box-like structure open at one end, having an extended portion opposite the open end with a flange, such flange being adapted to be connected to a universal joint housing of a drive shaft, a plate secured to the open end of the housing, a clutch coupling having a hub journaled in the extended portion of the housing and a flange extending inwardly of said housing, a ring member secured to the housing and engaging the flange of the clutch coupling, a main shaft rotatably mounted in the clutch coupling and in the bearing, said shaft having a squared section, a bevel gear rotatably mounted on the shaft adjacent the plate, a slidable clutch mounted on the squared section of the main shaft and adapted to engage either the clutch coupling or the bevel gear, a bearing in one of the side walls of the housing, a second shaft journaled therein, a second bevel gear mounted on the second shaft, meshing with the first bevel gear and means mounted outside of the housing to shift the clutch.

In testimony whereof I have signed my name to this specification.

W. C. PAULING.